Sept. 20, 1966 B. BRIGHTMAN 3,274,342

COMMON CHANNEL COMMUNICATION SYSTEM CONFERENCE CIRCUIT

Filed Jan. 4, 1962 3 Sheets-Sheet 1

INVENTOR.
BARRIE BRIGHTMAN
BY
George W. Killian
AGENT

Sept. 20, 1966 B. BRIGHTMAN 3,274,342

COMMON CHANNEL COMMUNICATION SYSTEM CONFERENCE CIRCUIT

Filed Jan. 4, 1962 3 Sheets-Sheet 2

United States Patent Office 3,274,342
Patented Sept. 20, 1966

3,274,342
COMMON CHANNEL COMMUNICATION SYSTEM CONFERENCE CIRCUIT

Barrie Brightman, Webster, N.Y., assignor, by mesne assignments, to Stromberg-Carlson Corporation, Rochester, N.Y., a corporation of Delaware Filed Jan. 4, 1962, Ser. No. 164,247
7 Claims. (Cl. 179—18)

Figure 1:
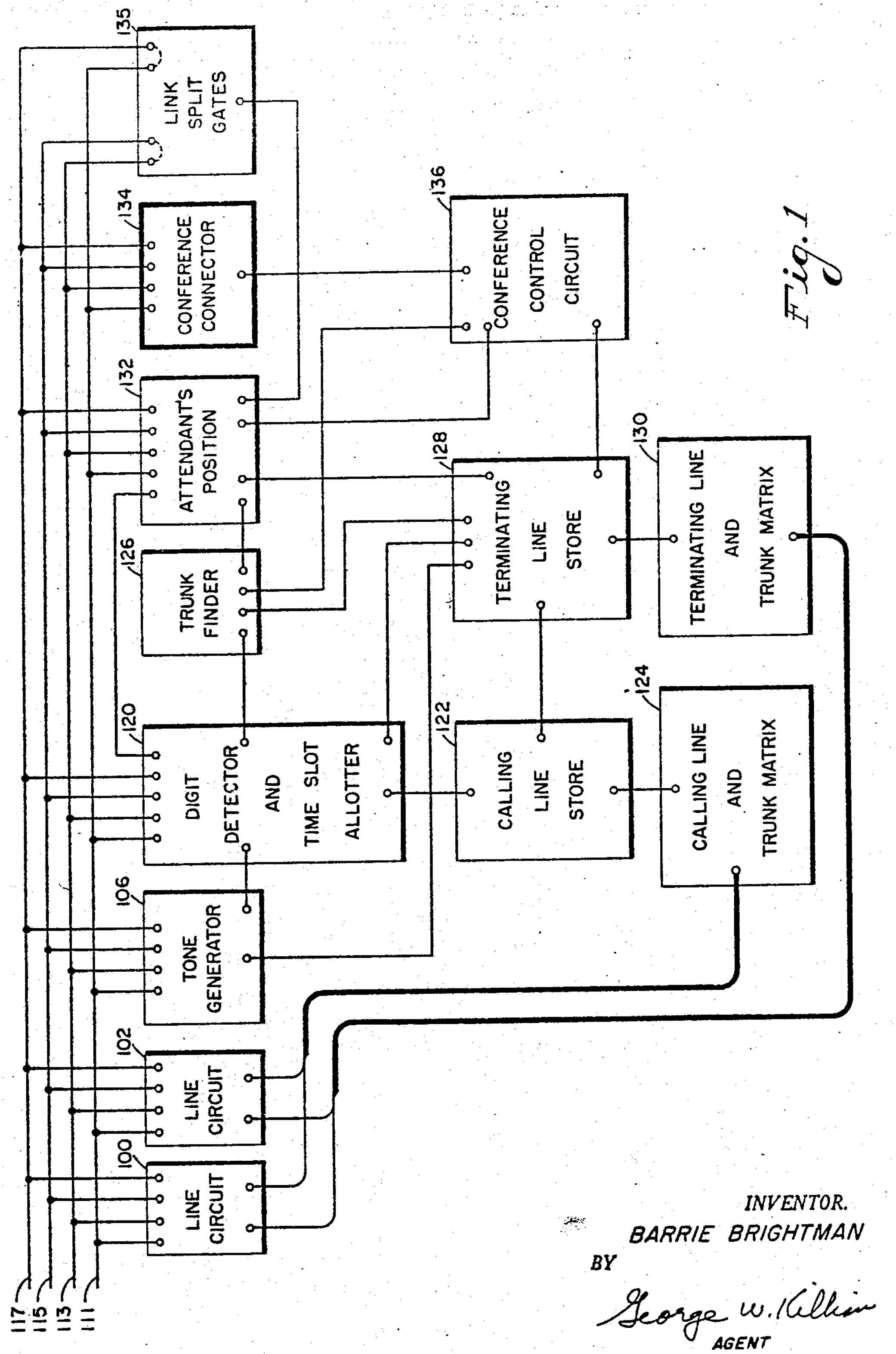

This invention relates in general to communication systems and, more particularly, to systems for providing simultaneous communication between a plurality of stations.

Numerous situations arise wherein it is desirable to provide communication between a plurality of stations. For example, in telephone systems it is frequently necessary to interconnect three or more stations for simultaneous communication; intercom systems are frequently required to provide two-way communication between a plurality of stations; and telemetering systems frequently require simultaneous communication between a plurality of stations. Many other situations requiring communication between a plurality of stations will readily occur to those skilled in the art.

In the communication system of the type shown in the copending application of Bartlett et al., Serial No. 45,341, filed July 26, 1960, now Patent No. 3,171,896, and assigned to the same assignee as the present invention, there is disclosed a time division multiplex telephone system including means for establishing a conference communication between a plurality of subscribers, each connected to individual line circuits. In the cited system when a conference connection is to be established, the line circuit associated with the originating subscriber is connected to the common communication highway in an idle time slot in a repetitive time frame and thereafter dial tone is returned to the calling subscriber. The dialing of a predetermined access code marks the call as one desiring access to conference equipment and, therefore, an idle conference control circuit and a conference connector are seized. The conference control circuit causes a digit detector and time slot allotter to allot additional idle time slots for subsequent use by the called line circuits. After the idle time slots have been assigned, a second dial tone is returned to the originating subscriber to advise him that the designation of the first line circuit that is to be connected to the conference circuit may be dialed. The dialed designation is received by the digit detector and time slot allotter and transferred to the terminating line store in the time slot assigned to the calling line circuit. After making the busy test, the called line circuit is rung and, upon receipt of an answer supervisory signal, the designation of the first called party is transferred from the time position of the calling circuit to one of the idle time slots referred to above. In a similar manner, the calling subscriber dials the number of the second and subsequent called parties, all as more fully described in the cited Bartlett et al. application.

The conference connector includes a delay line for circulating the time slot assigned to the calling line and the time slots assigned to the called line circuits. These circulating time slots continuously operate a ring counter, each stage of which successively connects an audio gate in the conference connector to the common communication highway in successive ones of the time slots stored in the conference connector. One terminal of each of the audio gates is connected to a first terminal of an associated audio signal storing means which have second terminals that are connected in common. Thus, the speech information received from the common communication highway through the audio gates in any one of the plurality of time slots is distributed to the storage means associated with the remaining time slots and the audio signals stored during a time frame are transferred back to the common communication highway in all of the other time slots in the frame. This permits the calling and called parties to communicate over the common communication channel even though the calling and called circuits are each assigned a different time slot.

The distribution of the speech information received from the common communication channel through any one of the gates is, as mentioned, distributed to the storage means associated with the remaining gates. This division of power causes an inevitable transmission degradation which creates a practical limit to the maximum number of stations which may be connected for common communication through the conference connector.

It is the general object of this invention to provide a new and improved communication system.

It is a more particular object of this invention to provide a new and improved communication system which provides for simultaneous communication between a plurality of stations.

It is another object of this invention to provide new and improved conference facilities in a time division multiplex system in which there is a minimum transmission degradation irrespective of the number of stations connected together for common communication therebetween.

In accordance with this invention, the audio signal storage means associated with each of the stations connected for common communication is provided with a signal output terminal and a plurality of signal input terminals. The signal output terminal of each device is connected to an individual signal input terminal of each of the other devices. Each of the devices has a separate high impedance amplifier connected to each of the signal input terminals. The output of each of the high impedance amplifiers is connected together and gated to the common communication channel in the time slot assigned to that device. In this manner, the transmission degradation is maintained at a minimum and is constant irrespective of the number of stations connected together for common communication. A four-wire system is used for interconnecting the plurality of storage devices inasmuch as they have separate output and input signal terminals. The invention disclosed herein may be used with a two-wire system such as that disclosed in the cited Bartlett et al. application by employing hybrid coils to provide the separate signal output and input terminals from the storage devices. Or a four-wire system may be used throughout thereby eliminating any need for hybrid coils.

Further objects and advantages of the invention will become apparent as the following description proceeds, and features of novelty which characterize the invention will be pointed out in particularity in the claims annexed to and forming a part of this specification.

Figure 2:
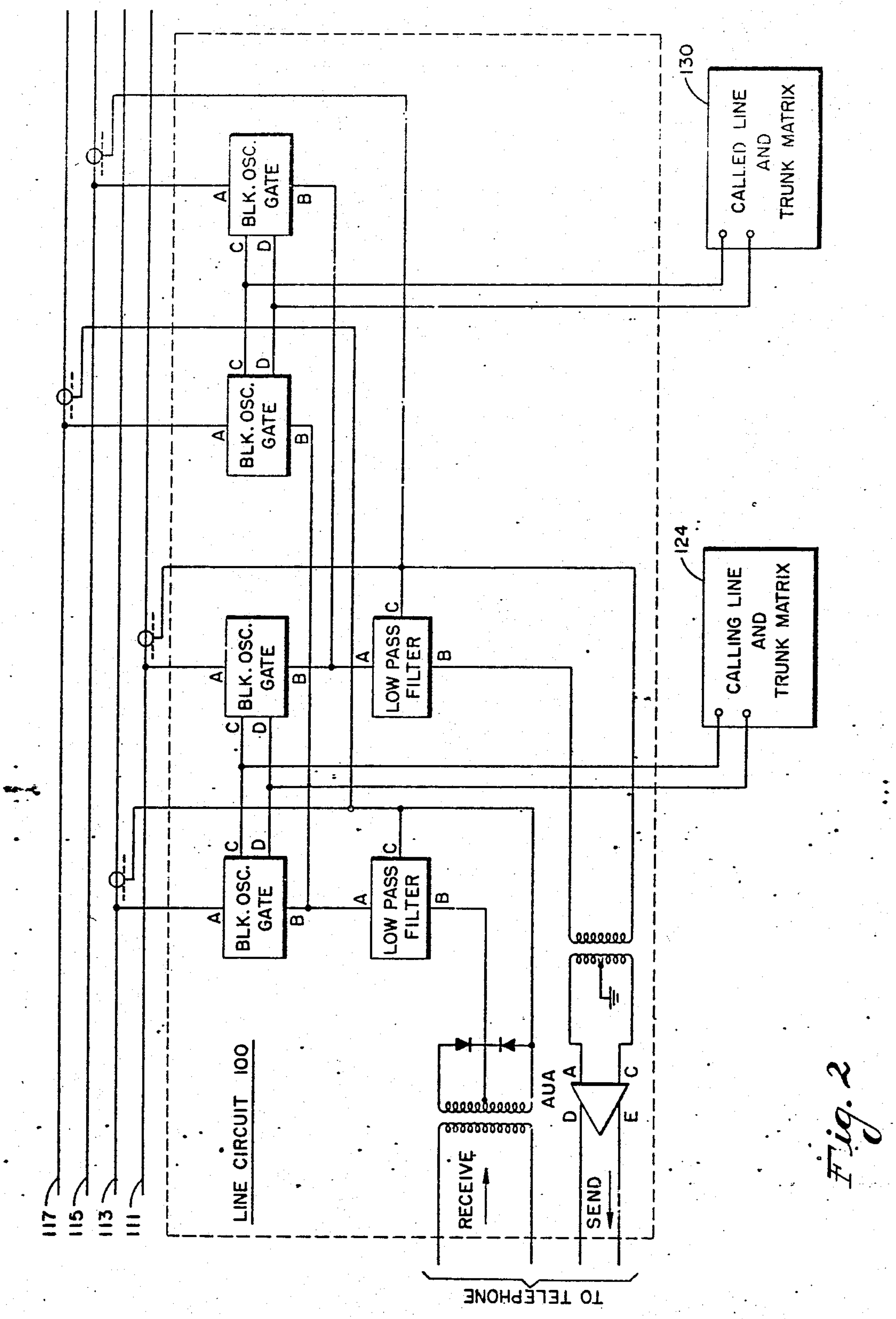
Figure 3:
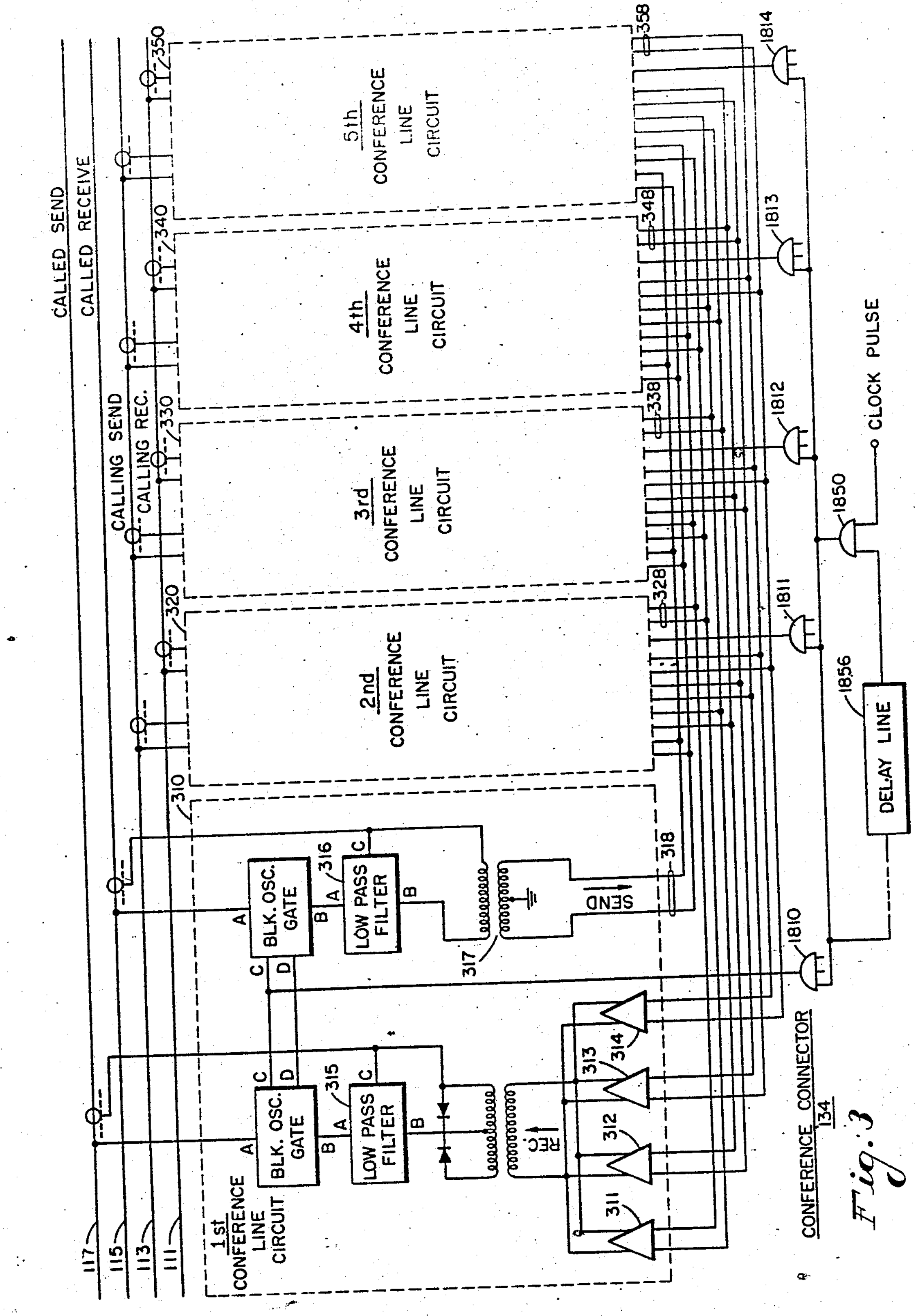

For a better understanding of the invention, reference may be had to the accompanying drawings in which:

FIG. 1 illustrates a block diagram of a telephone system incorporating the invention, and FIGS. 2 and 3, which should be arranged in order from left to right, show the invention in logic diagram form.

It is to be understood that only the details necessary to understand the invention have been shown. For example, although the invention is illustrated as it might be used in a time division multiplex telephone system, the details of the telephone switching circuits are not disclosed herein as it is believed that this would only tend to mask or obscure the invention. In addition, the invention is disclosed in logic diagram form in order to more clearly and distinctly teach the inventive concept than would be possible if the detailed circuits were shown.

It is believed that the invention can best be understood by considering a communication system incorporating the invention. FIG. 1 shows, in block diagram form, a time division multiplex telephone system which employs switching techniques similar to those described in the cited Bartlett et al. application. The principal difference between the communication system of FIG. 1 and the one described in the Bartlett et al. application is that the former employs four-wire switching, while the latter uses a two-wire switching system. That is, in the Bartlett et al. application, a common communication channel is used for both sending and receiving while in the present invention a system employing separate send and receive channels is used. Patent No. 2,968,698, issued January 17, 1961, to Brightman et al., teaches a four-wire switching system. The two types of systems require different line circuits and, therefore, line circuits 100 and 102 will take the form shown in FIG. 2 of this application and as FIG. 37 of the cited Brightman et al. patent. The common communication channel comprises four parts, the called send and receive highways or channels 117 and 115, respectively, and the calling send and receive highways or channels 113 and 111, respectively. The highway 113, on which the calling party sends information, is, of course, coupled to highway 115, the called receive highway. In a similar manner, the highway 117, on which the called party sends information, is, of course, coupled to highway 111, the calling receive highway. The required coupling may be completed through link-splitting gates 135, which may be controlled from the attendant's position 132, in order to provide means for the operator to talk exclusively to either the called or calling party as may be required. Because a given line circuit, such as line circuit 102 or 104, may serve as either a calling or called line circuit, it is necessary for each line circuit to have access to all four highways 111–117. Naturally, the line circuit is coupled only to one pair of the send and receive highways at a time.

FIG. 2 illustrates a line circuit in logic diagram form. Suitable circuits for the logic elements are shown in the cited Brightman et al. patent. A plurality of similar line circuits are provided in the system and the switching circuits permit any selected pair of line circuits to be coupled together for conversation over the common communication channel. The switching system may be of a type which responds to directive signals of the multifrequency type or to loop pulsing. If loop pulsing is employed, the line circuit 100 must be modified in a manner well known to those skilled in the art to detect and repeat the loop pulses. The cited Brightman et al. patent describes a switching system which responds to multifrequency directive signals, while the Bartlett et al. application describes a switching system which responds to loop pulses.

The conference connector 134 includes a plurality of conference line circuits 310, 320, 330, 340 and 350. Although five conference line circuits are illustrated, any greater or lesser number may be accommodated by the system. The number of conference line circuits is determined only by the maximum number of lines that it is desired to connect together for common communication. Since the conference line circuits are identical, only one is shown in detail. It will be noted that the conference line circuits bear a marked resemblance to line circuit 100. However, since a particular conference line circuit is not required to selectively serve as either a called or calling line circuit, it is not necessary for that conference line circuit to be coupled to all four highways 111–117 of the common communication channel. Accordingly, it will be noted that each conference line circuit is coupled only to one sending and receiving pair of the highways and that there is a corresponding reduction in the number of blocking oscillator gates in the conference line circuit. Conference line circuit 310, the first conference line circuit in the group, will be coupled to the common communication channel in the same time slot as the calling line and, therefore, conference line circuit 310 is coupled thereto as a called line. The remaining conference line circuits are coupled to the common communication channel as calling line circuits and the line circuits to which they are respectively coupled in response to directive signals from the calling line will, of course, be coupled to the common communication channel as called lines. A typical method of assigning time slots to the calling and called lines and the manner of associating the conference line circuits with the subscriber line circuits is completely set forth in the cited Bartlett et al. application.

Each conference line circuit includes a plurality of amplifiers numbering one less than the total number of conference line circuits. For example, in the illustrated case there are five conference line circuits and four amplifiers 311–314 in conference line circuit 310. Each of these amplifiers is identical and may be of any suitable type which has a high input impedance. For example, the amplifiers might be of type AUA described in the Brightman et al. patent and modified to have a high input impedance, or the desired input impedance might be obtained by means of suitable input transformers. The output of all the amplifiers 311–314 is connected in parallel and to audio signal storing means 315. Therefore, any signal transmitted through one of the amplifiers will be stored in the audio signal storing means 315 in the manner more fully explained in the cited Bartlett et al. application. The signals will be transmitted to the common communication channel in the time slot of the calling line as controlled by the output signal from gate 1810, which is periodically opened by signals from delay line 1856 which circulates time slot signals, all as fully described in the cited Bartlett application. In a similar manner, the gates 1811–1814 are periodically enabled by the output signals of the delay line 1856 to sequentially couple each of the conference line circuits to the common communication channel in the time slot assigned to that conference line circuit and the subscriber's line circuit associated therewith for the conference connection. The elements illustrated in FIG. 3 which do not start with the digit "3" are numbered to correspond with similar elements in the cited Bartlett et al. application. Audio signals from the calling line circuit which are to be transmitted over the common communication channel to the other line circuits connected in the conference connection are transferred to the audio signal storing means 316 in conference line circuit 310 in the time slot assigned to the calling line.

The audio signal transferred to the storing means 316 is transferred to each of the other conference line circuits on a space division basis. More specifically, the received audio signal is passed through transformer 317 and appears as an output signal across the leads designated 318. The leads 318 are coupled to the input terminals of the first amplifier in each of the other conference line circuits. However, none of the output signal on lead 318 is fed back to conference line circuit 310. In a similar manner, any audio signal transferred to conference line circuit 320, in the time slot assigned to it, appears as an output signal across the leads designated 328 to provide an input signal to all the conference line circuits except conference line circuit 320. The other conference line circuits are connected in a similar manner so that any audio signal transferred to them causes an input signal to one of the amplifiers in each of the other conference line circuits.

Accordingly, any signal transferred on a time division basis from a subscriber's line circuit to his associated conference line circuit causes a corresponding signal to be stored in an audio signal storing means in each of the other conference line circuits for subsequent transmission to its associated subscriber's line circuit in the assigned time slot. In this manner, the five subscribers, who are each assigned a different time slot, can be engaged in a common conversation over a common communication channel.

For proper impedance matching, each of the amplifiers should have an input impedance equal to $n$ times the impedance between the output terminals 318 where $n$ is the number of amplifiers in each conference line circuit.

In situations wherein it is desired to have fewer subscribers connected to the conference circuit than the maximum number provided (five in the illustrated case), one or more of the conference line circuits will remain unused and will not be sequentially coupled to the common communication channel. However, since the output terminals 318, 328, 338, 348 and 358 are connected by wire strapping on a space division basis to the input terminals in each of the other conference line circuits, the loading of the output terminals remains a constant and, therefore, a constant loss is induced into the system and this loss may be compensated for by the amplifiers. Accordingly, a system has been provided in which the grade of transmission is constant and independent of the number of parties connected to the conference circuit. That is, irrespective of loading, the input to each conference line circuit remains at a constant level.

While there has been shown and described what is considered at present to be the preferred embodiment of the invention, modifications thereto will readily occur to those skilled in the art. For example, the invention described herein could readily be adapted to provide a conference circuit of the "meet me" type in which each party, upon being advised that a conference is to be set up, dials a code number for gaining access to the conference circuit. Or, the invention could be used in a system having a fixed conference group wherein the conference connections to all parties are completed in response to the dialing of a single code. It is not desired, therefore, that the invention be limited to the embodiment shown and described, and it is intended to cover in the appended claims all such modifications as fall within the true spirit and scope of the invention.

What is claimed is:

1. In a communication system, a first and second plurality of stations, a common communication channel, first means responsive to predetermined signals from a calling one of said first plurality of stations for connecting said calling one of said first plurality of stations and one of said second plurality of stations to said common communication channel in a time position in a repetitive time frame, said first means responsive to subsequent signals from said calling one of said first plurality of stations for connecting a selected called one of said first plurality of stations and a second one of said second plurality of stations to said common communication channel in an individual time position in said respective time frame, each of said second plurality of stations having an output signal terminal and a plurality of input signal terminals, and second means for connecting the output terminal of each of said second plurality of stations to a separate one of said input terminals on each of the other of said second plurality of stations.

2. The combination set forth in claim 1 wherein said common communication channel comprises a first transmission channel for transmitting signals from said calling one of said first plurality of stations to said first-mentioned one of said second plurality of stations, a second transmission channel for transmitting signals from said first-mentioned one of said second plurality of stations to said calling one of said first plurality of stations, a third transmission channel for transmitting signals from said second one of said second plurality of stations to said selected called one of said first plurality of stations, and a fourth transmission channel for transmitting signals from said selected called one of said first plurality of stations to said second one of said second plurality of stations.

3. The combination set forth in claim 1 wherein the plurality of input signal terminals of said second plurality of stations are coupled through high impedance devices to said common communication channel for transmitting signals to said channel, and wherein the output signal terminal of each of said second plurality of stations is coupled to said common communication channel for receiving signals from said channel.

4. The combination set forth in claim 3 wherein said second means interconnects the output terminals and the input terminals of said second plurality of stations on a space division basis.

5. The combination set forth in claim 4 wherein said first and second stations are subscriber line circuits and conference line circuits, respectively.

6. In a communication system, a common communication channel, a plurality of pairs of circuits with each pair comprising a line circuit and a conference line circuit, first means for coupling a plurality of said pairs of circuits to said channel with each pair coupled thereto in an individual time position in a repetitive time frame, each of said conference line circuits having an output signal terminal and a plurality of input signal terminals, and second means for connecting the output terminal of each of said conference line circuits to a separate one of said input terminals on each of the other of said conference line circuits on a space division basis.

7. The combination set forth in claim 6 wherein each conference line circuit has the plurality of input signal terminals coupled through amplifiers having a high impedance input to said common communication channel for transmitting signals to said channel, and wherein the output signal terminal of each of said conference line circuits is coupled to said common communication channel for receiving signals from said channel.

No references cited.

KATHLEEN H. CLAFFY, *Primary Examiner.*

WILLIAM C. COOPER, ROBERT H. ROSE, *Examiners.*